(12) United States Patent
Giori et al.

(10) Patent No.: US 7,344,767 B2
(45) Date of Patent: Mar. 18, 2008

(54) SELF-COOLING BEVERAGE CONTAINER WITH PERMEABLE WALL

(76) Inventors: Serena Giori, 2975 Orange Brace Rd., Riverwoods, IL (US) 60015; Claudio Giori, 2975 Orange Brace Rd., Riverwoods, IL (US) 60015

( * ) Notice: Subject to any disclaimer, the term of this patent is extended or adjusted under 35 U.S.C. 154(b) by 290 days.

(21) Appl. No.: 10/710,636

(22) Filed: Jul. 26, 2004

(65) Prior Publication Data
US 2006/0019047 A1    Jan. 26, 2006

(51) Int. Cl.
*B32B 27/36* (2006.01)
*B65D 33/00* (2006.01)
*B65D 33/01* (2006.01)
*B65D 81/38* (2006.01)
*B65D 88/74* (2006.01)

(52) U.S. Cl. .................. 428/35.7; 428/35.2; 428/35.5; 428/36.1; 428/36.8; 383/100; 383/102; 220/592.01; 220/592.16; 220/592.17; 220/913

(58) Field of Classification Search ............... 428/35.2, 428/35.5, 36.1, 36.8; 383/100, 102; 220/592.01, 220/592.16, 592.17, 913
See application file for complete search history.

(56) References Cited

U.S. PATENT DOCUMENTS

| 2,467,792 A | * | 4/1949 | Wenzel et al. .............. 383/102 |
| 2,865,420 A | * | 12/1958 | Allenbach .................... 383/24 |
| 3,949,742 A | * | 4/1976 | Nowakowski ............... 602/46 |
| 4,368,766 A | * | 1/1983 | Nomi .......................... 383/80 |
| 5,703,161 A | * | 12/1997 | Steenblock et al. .......... 525/66 |
| 5,983,662 A | * | 11/1999 | Luetsch .................... 62/457.4 |
| 6,261,678 B1 | * | 7/2001 | von Fragstein et al. .. 428/315.9 |
| 6,679,991 B1 | * | 1/2004 | Van Andel ............... 210/321.6 |
| 6,716,778 B1 | * | 4/2004 | Hottner ...................... 442/199 |
| 2002/0160674 A1 | * | 10/2002 | Kinkelin et al. ............. 422/76 |

FOREIGN PATENT DOCUMENTS

WO    WO 0028807 A1 * 5/2000

OTHER PUBLICATIONS

Johnson et al., Breathable TPE Films for Medical Applications, Jul. 2000, Medical Device and Diagnostic Industry Magazine.*

* cited by examiner

*Primary Examiner*—Alicia Chevalier
*Assistant Examiner*—Christopher P Bruenjes

(57) ABSTRACT

A self-cooling container for water or other beverage utilizing a non-porous moisture vapor permeable membrane is provided. The membrane allows moisture vapor to escape while preventing penetration of contaminants including liquids, particulates, and bacteria. Evaporative cooling keeps the beverage temperature below ambient. Optionally, the membrane can be laminated to a fabric material for reinforcement.

4 Claims, No Drawings

SELF-COOLING BEVERAGE CONTAINER WITH PERMEABLE WALL

BACKGROUND OF INVENTION

This invention relates to a self-cooling container for water or other beverage. The wall of the container comprises a non-porous permeable membrane permitting transmission of water vapor. Evaporative cooling keeps the temperature of the water in the container below ambient.

Various approaches have been proposed to cool portable water containers in the absence of a conventional refrigeration device. A simple and effective system would be of great value for general outdoor use but unfortunately none of the methods suggested in the prior art meets the necessary requirements of simplicity and functionality.

A method proposed involves the use of an endothermic reaction to cool a liquid that is in contact with the water container. The method is undesirable because it is impractical, costly, and it involves the use of chemicals that may present a safety hazard. Furthermore, it provides a cooling effect that is only temporary.

The approach claimed in U.S. Pat. No. 5,983,662 utilizes evaporative cooling. A standard can is placed into a perforated structure having a layer of sponge disposed along its inner suface. The sponge material is kept wet with water. As the water evaporates from the sponge, the evaporative process draws heat from the surface of the can thus cooling its content. This method has several disadvantages. The construction of the device is relatively complex. Water must be frequently added to the sponge to maintain the evaporative process. Cooling is inefficient because heat is drawn from ambient air as well as from the can.

Other approaches utilize cooling by evaporation of the water present in the container itself. It has been known for a long time that canvas bags made of certain fabric materials such as flax cloth have the peculiar property of providing controlled seepage of water through the cloth to the outer surface. Evaporation of the water from the outer surface of the bag into the environment provides a cooling effect. U.S. Pat. No. 2,467,792 claims a similar effect from bags made of non-flax cloth, preferably cotton, impregnated with a material capable to fill the interstitial spaces of the fabric to limit exudation of water to the extent required to maintain a thin film of water on the outer surface without excessive oozing and dripping. U.S. Pat. No. 4,368,766 claims water containers with a porous wall having maximum pore size of 0.1-50 microns, preferably less than 5 microns. Continuously porous, expanded polytetrafluoroethylene film is said to be the preferred material, optionally laminated to a fabric on one or both sides. The fine pore size allows passage of water vapor but not liquid water, thus a cooling effect is produced while the outer surface of the container remains dry.

The problem with all containers utilizing porous or microporous walls to provide evaporative cooling is the potential for contamination. These containers permit evaporation because of tiny holes present in the container wall. A portable water container used recreationally on hiking and camping trips or by the military in field operations is likely to be exposed to dirt, rain and mud. Bacteria could find their way into the container if the outside surface of the container is exposed to dirty water. The problem could be aggravated if the container is exposed to dirty water while temporarily empty so that the driving force for water passage is from the outer to the inner surface.

Thus, a need exists for a portable water container capable of maintaining water below ambient temperature by evaporative cooling while assuring that the purity of the water is maintained with no possible effect of outside contaminants.

SUMMARY OF INVENTION

The present invention is directed to a self-cooling container for water or other beverage utilizing a moisture vapor permeable, non-porous membrane to provide evaporative cooling. The permeable membrane is monolithic and pinhole-free. It provides evaporative cooling by allowing moisture vapor to escape while preventing penetration of contaminants including liquids, particulates, and bacteria. Optionally, the membrane can be laminated to a fabric material for reinforcement.

DETAILED DESCRIPTION

While it is conceptually intuitive that a water container with porous walls may provide cooling by controlled evaporation, such an effect would not be expected with a container having a monolithic, non-porous construction. To achieve evaporative cooling with a non-porous container, the walls of the container must have the ability to transport moisture through a solution/diffusion mechanism, quite different from the transport of moisture through the walls of a porous material, where tiny holes provide a path for moisture passage.

For moisture transport to occur through a non-porous membrane, water must dissolve into the membrane, diffuse through the membrane and desorb from the opposite surface into the environment. This solution/diffusion process allows a non-porous membrane to transmit water vapor. In turn, as water is vaporized, a cooling effect is produced.

The ability of a membrane to transport water vapor is expressed by its permeability, which is defined as the rate of water vapor transmission through a unit area of material induced by a unit vapor pressure difference between the two surfaces under specified temperature and humidity conditions. The permeability P of a non-porous membrane is related to two more basic material properties, the diffusion coefficient D and the solubility coefficient S:

$$P=DS$$

The solubility coefficient S is a thermodynamic factor that defines the amount of water that can dissolve into the membrane. The diffusion coefficient D is a kinetic factor that defines the rate of moisture transport across the membrane. The product of D and S defines the ability of a non-porous membrane to transmit water vapor by a solution/diffusion mechanism and in turn its ability to provide the desired cooling effect.

The liquid water in the container is vaporized directly at the membrane interface, or vaporized into the free space above the water level to maintain equilibrium vapor pressure as water vapor diffuses out of the container. Either way, heat is absorbed in the endothermic process.

A high diffusion coefficient D is generally associated with rubbery polymers, that is, polymers having a low glass transition temperature (Tg), preferably below 0° C. In simple terms, the mobility of a polymer chain is sharply reduced as transition occurs from a rubbery state (above Tg) to a glassy state (below Tg). The chain mobility in a rubbery polymer allows diffusion of water molecules that would otherwise be difficult across a rigid, glassy polymer.

A high solubility coefficient S is generally associated with polymeric membranes having high affinity for water so that water molecules can effectively dissolve in the film. Of course, excessive affinity for water must be avoided as it may result in unacceptable swelling or even dissolution of the membrane.

A type of membrane that we found to be suitable for self-cooling, non-porous containers is made from a thermoplastic elastomer exhibiting the ability to transport water vapor by a solution/diffusion process. The preferred thermoplastic elastomers are block copolymers of the (AB)n type, consisting of alternating soft and rigid segments. These materials provide the required combination of high solubility coefficient and high diffusion coefficient for water permeation. The soft segment is typically an aliphatic polyether or polyester with high hydrophilicity. The soft aliphatic ether or ester blocks are linked to rigid, generally aromatic blocks via a urethane, amide or ester bond. Moisture breathable membrane films of this type are available from Epurex Films (a Bayer Polymer Company) in Germany and from Stevens Urethane (a unit of JPS Elastomerics), Mylan Technologies and Deerfield Urethane (also a Bayer Polymers Company) in the US.

Because of their monolithic, non-porous structure, these membranes have found application in the medical field where contamination is a concern. As wound dressings, they allow moisture to escape while acting as barriers to liquids, particulates and bacteria. Although these applications are well known, there has been no prior suggestion that these membranes could be utilized for the construction of beverage containers, whereby the high moisture vapor transmission provides evaporative cooling while the monolithic structure provides protection against water contamination.

The ability of a membrane to provide evaporative cooling of water is directly related to its moisture vapor transmission rate. The permeability P is the key factor determining the ability of a membrane to transport water vapor by a solution/diffusion mechanism. There are, however, other parameters affecting the water transport process. The transport of water vapor through a non-porous membrane under steady state conditions can be described by an equation based on Fick' First Law:

$$\Delta M_{H2O}/\Delta t = (P\ A\ \Delta p_{H2O})/L$$

where $\Delta M_{H2O}/\Delta t$ represents the steady state rate of water transport through the membrane, P is the membrane permeability, A is the surface area, L is the thickness of the membrane and $\Delta p_{H2O}$ is the vapor pressure difference across the membrane. The permeability P has been discussed above. The surface area A is dependent on container size and geometry. Container shapes maximizing the surface to volume ratio would provide more effective cooling. Embossing or engraving the membrane would also increase the surface area A and in turn increase the water vapor transmission rate and cooling ability. The water vapor transmission rate is inversely proportional to the thickness of the membrane L, that is, the thinner the membrane the greater the transmission rate. A preferred membrane thickness for a self-cooling water container is in the 10 to 75 micron range, most preferably in the 25-50 micron range. The water vapor pressure differential $\Delta p_{H2O}$ defines the driving force for evaporation across the membrane and is strictly dependent on environmental factors. When relative humidity reaches 100%, $\Delta p_{H2O}$ becomes zero and the membrane provides no cooling effect. In temperate climates with moderate humidity the membrane provides a significant cooling effect. In dry desert climates, $\Delta p_{H2O}$ is very high and the cooling effect is most pronounced.

The maximum cooling effect achievable by evaporation from a water container is the difference between dry and wet bulb temperature. The lower the relative humidity the greater is the difference between dry and wet bulb temperature and the greater the cooling ability of the container. Most physics handbooks have charts or tables showing the correlation between relative humidity and bulb temperatures.

The container can be designed in various ways depending on its specific end use. The water permeable membranes of this invention are typically made of thermoplastic materials that can be converted into bags using standard film conversion technologies including heat or high frequency sealing. Two membrane layers facing each other are sealed together along the peripheral edge to provide a water tight bond. If so desired, the bag can be made with the permeable membrane on one side only, while the other side could be made of a conventional impermeable thermoplastic film such as polyethylene or polyvinylchloride. Adhesive bonding along the peripheral edge of the bag can be used as an alternative to sealing. A spout can be attached to the top of the bag or a drain valve to the bottom of the bag using similar sealing methods or adhesive bonding techniques.

For added strength and durability, it is preferred to laminate the membrane to a porous fabric so that the fabric is on the outside of the container. Alternatively, the fabric could be on both sides of the membrane. Fabric lamination is particularly useful with very thin membranes. The fabric material can be knitted, woven or non-woven. The porous fabric does not affect transport of water vapor while it provides toughness and puncture resistance. Heat lamination or adhesive laminations are both viable options. If an adhesive is used for fabric lamination, care should be taken to ensure that the adhesive does not compromise permeability. The adhesive should preferably be applied only at the edges of the bag, or if applied over the entire membrane area it should be applied discontinuously. Discontinuous or pattern lamination of fabrics to films using adhesives is a well established technology.

A water bag having flexible walls such as the one just described can be folded when empty and carried conveniently. Soft water bags of this type are available commercially but are made of water barrier films that do not provide cooling. In fact, when these bags are used outdoors the temperature of the water often exceeds ambient temperature because heat is transferred to the water not only by conduction but also by radiation, and plastic materials are typically poor reflectors.

A particularly useful water bag design is the so called hydration bladder, which is provided with a long tube attached to the bottom of the bag to allow drinking during outdoors activities. This type of bag is very popular with hikers and bikers.

If a rigid container is desired, a rigid shape could be maintained by using a metallic grid or perforated rigid plastic for support.

The following example is provided for illustration purposes and is not intended to limit the scope of the invention.

EXAMPLE

A bag was made using a 25 micron thick polyetherurethane membrane film from Deerfield Urethane (Dureflex PT1710S). Two sheets placed one on top of the other were heat sealed together along the peripheral edge. The bag was filled with water at ambient temperature and hung outdoors in the shade. The outdoor temperature was 28° C., the relative humidity was 48% and the air was calm. The temperature of the water inside the bag began to drop immediately and reached a stable value of 21° C. after about 30 minutes. The wet bulb temperature for the given conditions of temperature and relative humidity was calculated to be 20° C., indicating that the water cooling effect approaches the wet bulb temperature depression. There was no significant water loss from the bag even after hanging for 24 hours.

It will be understood by those skilled in the art that many of the details presented in this disclosure may be varied without departing from the spirit and scope of the invention.

The invention claimed is:

1. A portable container for potable water or water-based beverage, wherein the wall of said container comprises a non-porous membrane made of a polymeric material comprising hydrophilic units and having the ability to transmit water vapor by a solution/diffusion mechanism, whereby water vaporization inside said container produces a cooling effect capable of maintaining the temperature of said beverage below ambient when relative humidity is below 100%.

2. The container of claim 1 wherein said hydrophilic units of said membrane comprise aliphatic ether or ester groups.

3. The container of claim 1 wherein said membrane comprises a thermoplastic elastomer selected from the group consisting of polyether-amides, polyester-amides, polyether-urethanes, polyester-urethanes, polyether-esters and copolyesters.

4. The container of claim 1 wherein a porous fabric is laminated to the outer surface or to both inner and outer surface of said membrane.

* * * * *